(12) United States Patent
Shelekhin et al.

(10) Patent No.: US 8,168,321 B2
(45) Date of Patent: May 1, 2012

(54) ALKALINE BATTERY HAVING A PROTECTIVE LAYER

(75) Inventors: Alexander B. Shelekhin, Ridgefield, CT (US); Daniel W. Gibbons, Southbury, CT (US)

(73) Assignee: The Gillette Company, Boston, MA (US)

( * ) Notice: Subject to any disclaimer, the term of this patent is extended or adjusted under 35 U.S.C. 154(b) by 1096 days.

(21) Appl. No.: 12/040,251

(22) Filed: Feb. 29, 2008

(65) Prior Publication Data

US 2009/0220855 A1  Sep. 3, 2009

(51) Int. Cl.
  *H01M 2/00* (2006.01)
  *H01M 2/16* (2006.01)
  *H01M 4/42* (2006.01)
  *H01M 6/00* (2006.01)
  *H01M 4/50* (2010.01)

(52) U.S. Cl. ........ 429/163; 429/246; 429/229; 429/224; 29/623.1

(58) Field of Classification Search .................. 429/163, 429/224, 229, 246; 29/623.1
See application file for complete search history.

(56) References Cited

U.S. PATENT DOCUMENTS

| | | | |
|---|---|---|---|
| 345,124 A | 7/1886 | De Virloy et al. | |
| 3,573,106 A | 3/1971 | Johnson et al. | |
| 3,893,870 A | 7/1975 | Kozawa | |
| 4,504,561 A | 3/1985 | Winsel | |
| 4,777,100 A | 10/1988 | Chalilpoyil et al. | |
| 4,994,333 A | 2/1991 | Jose et al. | |
| 4,999,264 A | 3/1991 | Shepard, Jr. et al. | |
| 5,080,985 A | 1/1992 | Wiacek et al. | |
| 5,300,371 A | 4/1994 | Tomantschger et al. | |
| 6,200,699 B1 | 3/2001 | Jose et al. | |
| 6,284,410 B1 | 9/2001 | Durkot et al. | |
| 6,500,576 B1 | 12/2002 | Davis et al. | |
| 6,514,637 B2 * | 2/2003 | Treger et al. | 429/56 |
| 6,521,378 B2 | 2/2003 | Durkot et al. | |
| 6,858,349 B1 | 2/2005 | Luo et al. | |
| 6,890,683 B2 | 5/2005 | Asahina et al. | |
| 2002/0172867 A1 | 11/2002 | Anglin | |
| 2004/0175613 A1 | 9/2004 | Eylem et al. | |
| 2004/0258995 A1 | 12/2004 | Costanzo et al. | |
| 2005/0233214 A1 | 10/2005 | Marple et al. | |
| 2006/0188779 A1 | 8/2006 | Yoppolo et al. | |
| 2007/0224495 A1 | 9/2007 | Gibbons et al. | |

FOREIGN PATENT DOCUMENTS

WO  WO 00/33397 A1 *  6/2000
WO  WO 2006/088959 A1  8/2006

* cited by examiner

*Primary Examiner* — Karie O'Neill Apicella
(74) *Attorney, Agent, or Firm* — Fish & Richardson P.C.

(57) ABSTRACT

An alkaline battery can include a housing, a cathode within the housing, an anode, a separator between the anode and the cathode, and an alkaline electrolyte contacting the anode and the cathode. The cathode defines an anode cavity and the anode is deposited within the anode cavity. The cathode has a top surface adjacent to the anode cavity. The battery can include a protective layer deposited on the top surface of the cathode and/or a gel plug deposited over the anode. The protective layer can include a PVA layer coated over the top surface of the cathode.

31 Claims, 8 Drawing Sheets

ALKALINE BATTERY HAVING A PROTECTIVE LAYER

TECHNICAL FIELD

The invention relates to batteries, as well as to related components and methods.

BACKGROUND

Batteries or electrochemical cells are commonly used electrical energy sources. A battery contains a negative electrode, typically called the anode, and a positive electrode, typically called the cathode. The anode contains an active material that can be oxidized; the cathode contains or consumes an active material that can be reduced. The anode active material is capable of reducing the cathode active material.

When a battery is used as an electrical energy source in a device, electrical contact is made to the anode and the cathode, allowing electrons to flow through the device and permitting the respective oxidation and reduction reactions to occur to provide electrical power. An electrolyte in contact with the anode and the cathode contains ions that flow through the separator between the electrodes to maintain charge balance throughout the battery during discharge.

This application is directed towards battery arrangements and methods of producing battery arrangements that minimize battery failure. For example, the migration of particles of anode material can result in reduced conductivity between anode particles. Furthermore, the migration of anode material to make direct contact with the cathode material can result in an internal shorting of the battery. Migration can be the result of jarring forces experienced by the battery prior to or during use. For example, a battery on a store shelf could drop onto a hard surface. Accordingly, the various arrangements disclosed herein minimize the migration of anode material and/or minimize contact between anode material and cathode material.

SUMMARY

An alkaline battery is disclosed that includes a housing, a cathode within the housing, an anode, a separator between the anode and the cathode, and an alkaline electrolyte contacting the anode and the cathode. The cathode defines an anode cavity and the anode is deposited within the anode cavity. The cathode has a top surface adjacent to the anode cavity. The battery includes a protective layer deposited on the top surface of the cathode.

In some embodiments, the anode can include zinc and the cathode can include manganese dioxide.

In some embodiments, the separator can include a piece of separator material wound into a sleeve having a longitudinal wall defining a cross-sectional shape corresponding to dimensions of the anode cavity. The separator can include a plurality of notches at at least one longitudinal end of the sleeve, the notches defining a plurality of segments. The plurality of segments can be positioned radially inward relative to the longitudinal wall of the sleeve to define a transverse wall. For example, the housing can include a cell closure having a convex inside surface positioned above the anode cavity and the transverse wall can have a convex shape and can abut the convex inside surface. In some embodiments, the sleeve can have at least a 25% overlap of the paper based on the surface area of the sleeve. For example, the sleeve can include at least an 80% overlap of the paper based on the surface area of the sleeve and the plurality of segments extend radially outward to define the protective layer.

In some embodiments, the protective layer can include a washer shaped piece of separator material. In some embodiments, the protective layer can include a layer of polyvinyl alcohol, ethyl vinyl acetate polymer, or a vinyl acetate/ethylene copolymer. For example, the protective layer can be a layer of boric acid cross-linked polyvinyl alcohol. In some embodiments, the battery can include a layer of cross-linked polyvinyl alcohol on the top surface of the cathode, the anode, or a combination thereof, which can be in addition to the protective layer. In some embodiments, the protective layer can be electronically insulating. For example, the protective layer can include a polymeric material resistant to potassium hydroxide (e.g., polyamide based sealants and/or asphalt-based sealants).

In some embodiments, the battery can further include a gel deposited over the anode within the cavity. The gel material can include an amount of the electrolyte and an amount of a gellant also present within the anode.

In some embodiments, the structure of the battery can make it such that less than two percent of the batteries experience voltage drop of greater than a 0.01 volts between a pre drop test Open Circuit Voltage ("OCV") measurement and a post drop test OCV measurement. The structure of the battery can also make it such that at least 98 percent of the batteries retain at least 95% of the capacity of the battery after a drop test. The drop test includes the steps of dropping the battery six times from a height of 1 meter onto a concrete surface, including dropping each battery so that the battery lands twice on each end of the battery and so that it lands twice along the side of the housing of the battery, and storing the battery after the six drops for at least 24 hours at room temperature prior to testing the battery with an post drop test OCV measurement or to determining the remaining capacity of the battery.

In some aspects, an alkaline battery is disclosed that includes a housing, a cathode within the housing, an anode, a separator between the anode and the cathode, and an alkaline electrolyte contacting the anode and the cathode. The cathode defines an anode cavity and the anode is deposited within the anode cavity. The battery includes a gel deposited over the anode within the anode cavity. The gel includes the electrolyte and a gellant.

In some aspects, an alkaline battery is described that includes a housing, a cathode within the housing, an anode, a separator between the anode and the cathode, and an alkaline electrolyte contacting the anode and the cathode. The cathode defines an anode cavity and the anode is deposited within the anode cavity. The housing includes a cell closure having an inside surface positioned above the anode cavity. The separator includes a piece of separator material wound into a sleeve having a longitudinal wall defining a cross-sectional shape corresponding to dimensions of the anode cavity. The separator includes a plurality of notches at one longitudinal end of the sleeve. The notches define a plurality of segments. The plurality of segments are positioned radially inward relative to the longitudinal wall to define a transverse wall that abuts the inside surface.

In some aspects, an alkaline battery is described that includes a housing, a cathode within the housing, an anode, a separator between the anode and the cathode, and an alkaline electrolyte contacting the anode and the cathode. The cathode defines an anode cavity and the anode is deposited within the anode cavity. The battery includes a layer of polyvinyl alcohol on a top surface of the cathode, the anode, or combinations thereof. In some embodiments, the layer of polyvinyl alcohol can be cross-linked, for example, with boric acid.

A method of making an alkaline battery is described that includes adding a first amount of an electrolyte to the inside of a battery housing, the battery housing including a cathode defining an anode cavity and a separator within the cavity, adding an anode material into the anode cavity such that the separator is between the anode material and the cathode, and depositing a gel over the anode material in the anode cavity, the gel including a second amount of the electrolyte.

In some embodiments, the first amount of the electrolyte is allowed to completely absorb into the cathode and the separator prior to adding the anode material into the anode cavity. In some embodiments, the anode material can include a gellant material (e.g., the same gellant material as in the anode material). In some embodiments, the method can further include coating a top surface of the cathode with a layer of cross-linked polyvinyl alcohol.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1:
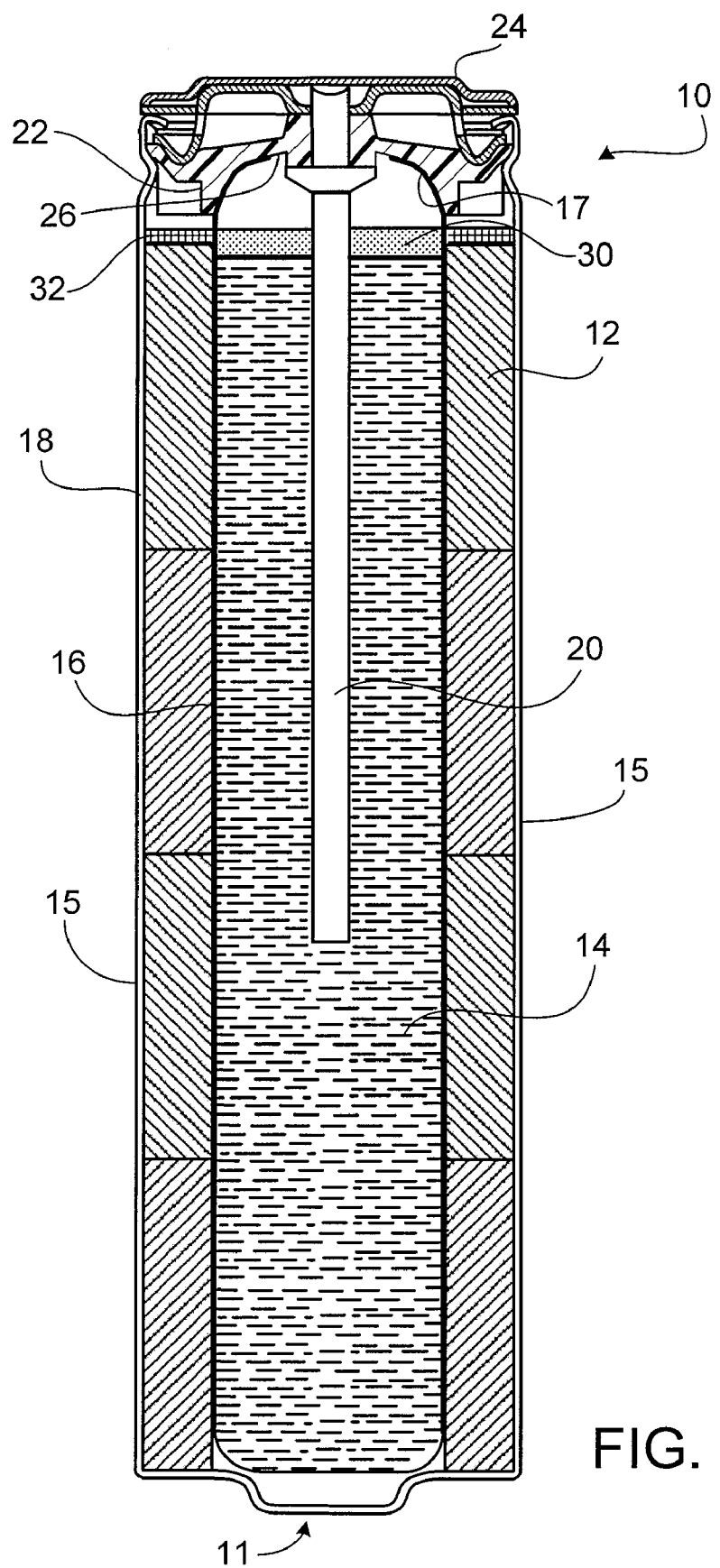
FIG. 1 depicts a cross-sectional view of an implementation of an embodiment of a battery.

Referring to FIG. 1, a battery or electrochemical cell 10 has a housing 18 containing a cathode 12, an anode 14, and a separator 16 between the cathode 12 and anode 14. Housing 18 is a cylindrical housing having an interior surface and an exterior surface. Cathode 12, which is in contact with the interior surface of housing 18, includes a cathode active material, and anode 14 includes an anode active material. As shown, the cathode 12 includes a plurality of stacked hollow cylindrical pellets that form a cavity for the anode 14. An electrolyte also is dispersed throughout the battery 10. The housing 18 includes a cylindrical portion 15, a negative terminal 9, and a positive terminal 11. Negative terminal 9 includes a seal 22, a metal top cap 24, and a current collector 20. Positive terminal 11 is at the end of battery 10 opposite from negative terminal 9.

Anode 14 includes particles of anode active material. For example, the active anode material can be zinc particles. These particles of anode active material are deposited into an anode cavity defined by the cathode 12. These particles, however, can migrate during the life of the battery and result in performance problems. For example, anode particles can be displaced out of the anode cavity to make contact with a top portion of the cathode 12, which can result in a battery failure. Furthermore, the movement of the anode particles inside of the anode cavity can result in reduced particle to particle contact and thus decrease particle to particle conductivity, which can reduce battery life or can result in periodic reductions in the voltage output of a battery. Furthermore, the movement of the anode material can stress the separator 16. Accordingly, a number of features are disclosed herein that minimize the migration of anode particles and/or minimize contact between the anode material and the cathode material. Each of the features described herein can be used alone or in combination with the other features.

Anode 14 can, in some embodiments, be in the form of a slurry of the anode particles and the electrolyte. For example, the anode particles can be zinc particles. Examples of zinc particles include those described in Durkot et al., U.S. Pat. No. 6,284,410, and in Durkot et al., U.S. Pat. No. 6,521,378. In certain embodiments, the anode 14 can include spherical zinc particles. Spherical zinc particles are described, for example, in Costanzo et al., U.S. Patent Application Publication No. US 2004/0258995 A1, published on Dec. 23, 2004, and entitled "Anode for Battery". The zinc particles can be a zinc alloy (e.g., containing a few hundred parts per million of indium and bismuth). An anode may include, for example, from about 40 percent to about 90 percent (e.g., from about 67 percent to about 80 percent) zinc particles by weight. In certain embodiments, the anode can include 68% zinc particles by weight and 15% zinc fines.

The anode 14, in some embodiments, can include a gelling agent. Examples of gelling agents include polyacrylic acids, grafted starch materials, salts of polyacrylic acids, polyacrylates, carboxymethylcellulose or combinations thereof. Examples of polyacrylic acids include Carbopol 940 and 934 (available from Noveon Inc.) and Polygel 4P (available from 3V). An example of a grafted starch material is Waterlock A221 (available from Grain Processing Corporation, Muscatine, Iowa). An example of a salt of a polyacrylic acid is Alcosorb G1 (available from Ciba Specialties). An anode may include, for example, from about 0.1 percent to about one percent gelling agent by weight.

Battery 10, as shown in FIG. 1, includes a gel plug 30 disposed above the anode 14. The gel plug 30 does not include active anode material, but rather minimizes the migration of portions of the anode 14 (e.g., zinc fines or zinc particles). The gel plug 30 can include the electrolyte dispersed throughout the battery and a gelling agent. In some embodiments, the gel plug 30 can also include a superabsorbant. The gel plug 30 can have a higher percentage of the gelling agent than the anode 14. For example, the gel plug 30 can include between 1 and 5 weight percent gelling agent (e.g., 2 weight percent gelling agent). The gelling agent can be the same as the gelling agent used in the anode 14 or a different gelling agent. In some embodiments, the gel plug 30 can include 0.1 weight percent Waterlock A221 and 1.9 weight percent Carbopol 940.

The gel plug 30 can have a high viscosity that restricts movement of the anode inside of the anode cavity and minimizes anode particle spillover onto the top of the cathode consol. The addition of the gel plug 30 can result in improved drop test results. For example, a drop test can include dropping a battery to allow free fall from a height of one meter under ambient conditions onto a hard, rigid surface of concrete to simulate a random drop of a battery by a consumer. A drop test can include dropping the battery six times so that the battery impacts the hard, rigid surface of concrete twice at each end and twice along the side of the cylindrical wall of the housing of the battery. The drop test can include storing the battery at ambient conditions for at least 24 hours after dropping the battery. After storing the battery for at least 24 hours, an OCV measurement can be taken to detect battery failures or reductions in battery voltage output due to the drops of the battery during the drop test.

Figure 2A:
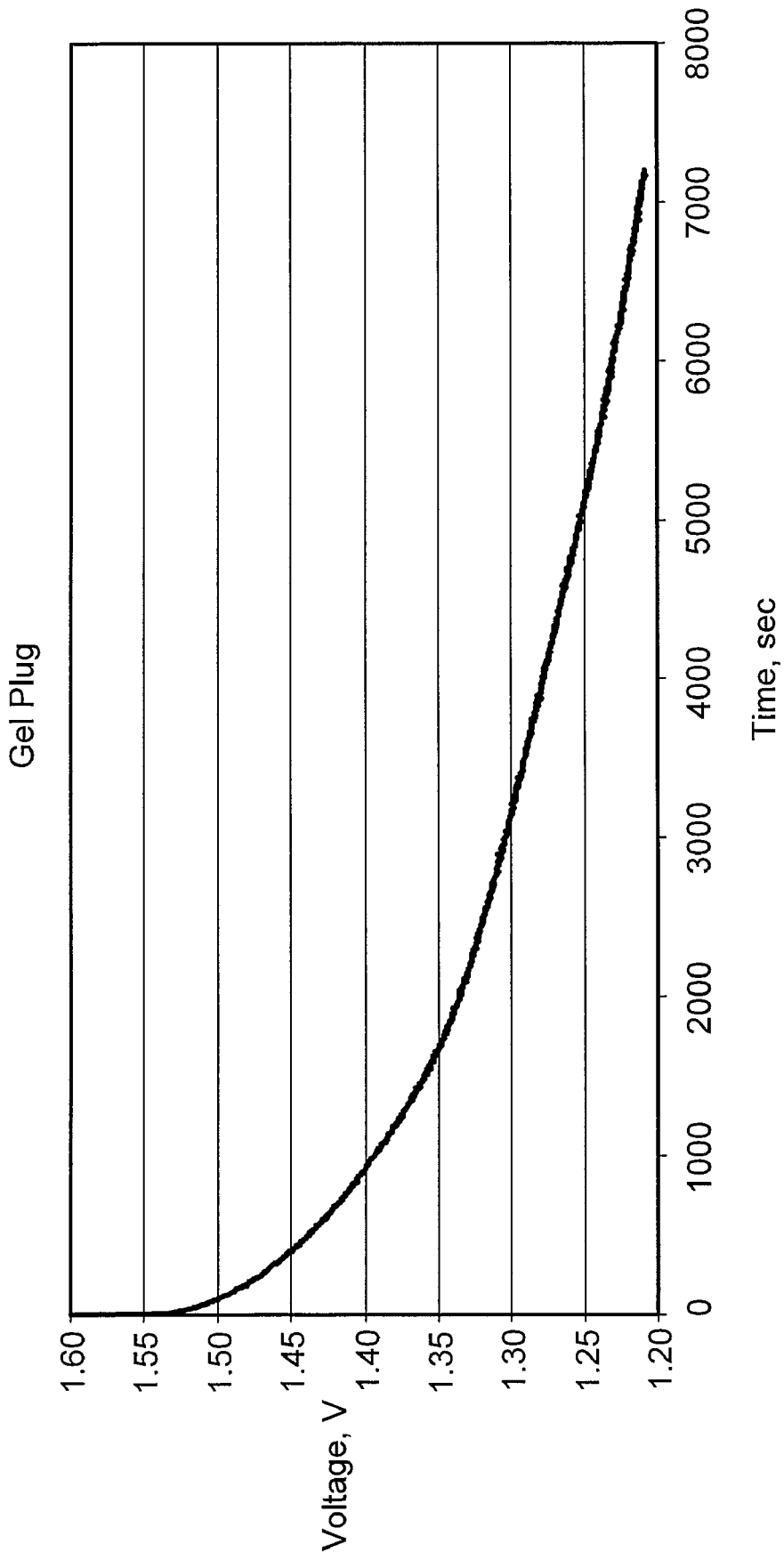
FIGS. 2A and 2B depict test results for batteries with and without gel plugs, after a drop test.
Figure 2B:
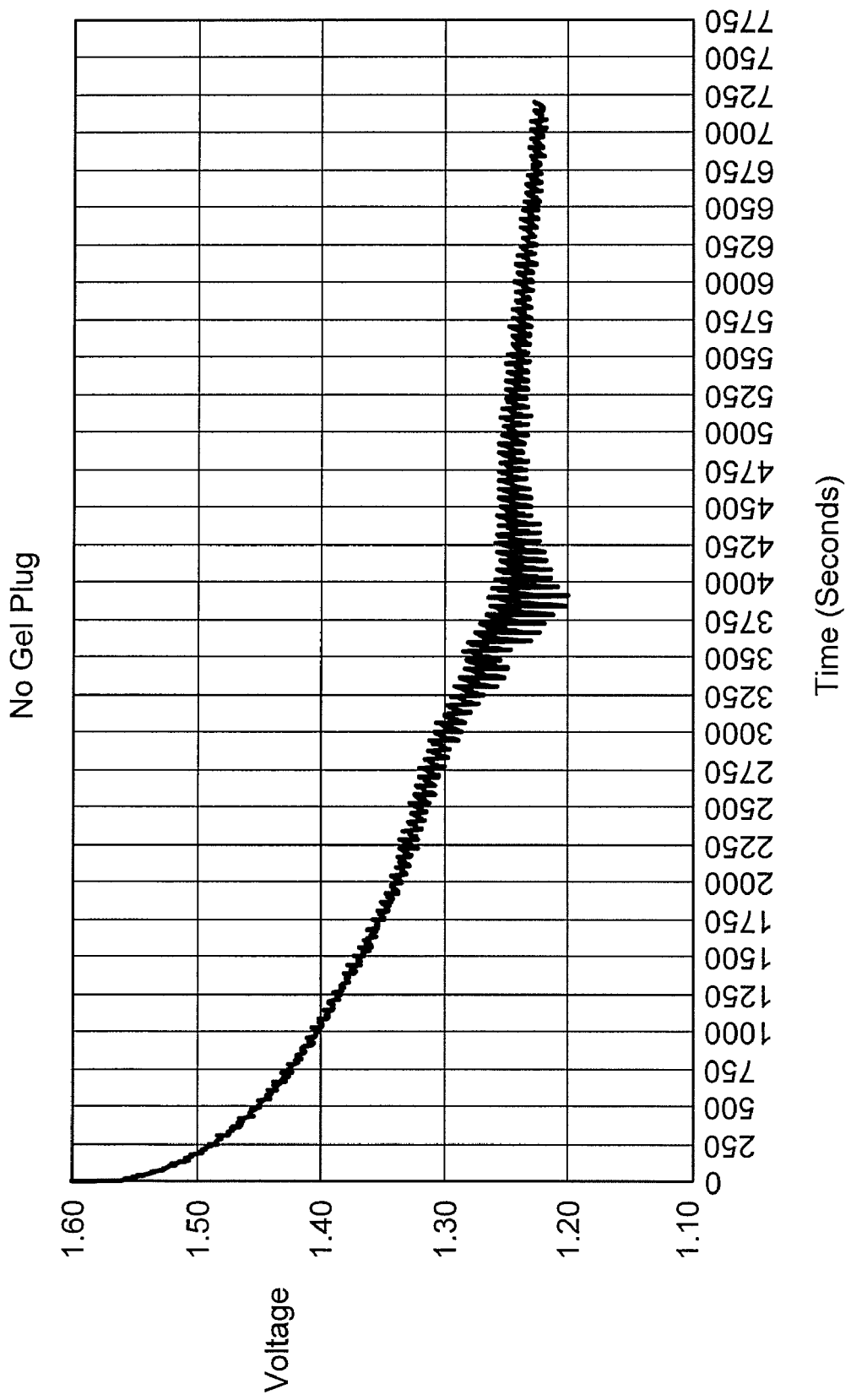

The gel plug 30 can also improve particle to particle conductivity when the battery is subjected to jarring conditions. For example, FIGS. 2A and 2B depict examples of a Load Voltage Instability ("LVI") tests. An LVI test includes subjecting a battery to a jarring taping force during the discharge of the battery and measuring the output of the battery. FIG. 2A depicts an example of an LVI test result for a battery having a gel plug, while FIG. 2B depicts an example of an LVI test result for a battery not having a gel plug, but otherwise identical to the battery tested in FIG. 2A. Each battery includes a zinc anode having 68% loading with 15% fines. As is clear from a comparison of FIGS. 2A and 2B, the presence of a gel plug 30 improves the LVI test performance of the battery because the battery with the gel plug does not experience voltage output variations during discharge due to the jarring taping force of the LVI test. This suggests that the presence of the gel plug 30 can result in a battery that reduces the shifting of anode particles that can result in a reduction of particle to particle conductivity.

The anode 14, in some embodiments, can have an anode height of less than the cathode height to provide additional space for the gel plug 30. For example, the zinc slurry can be filled within the cavity to a height 93% of the height of the cathode 12, and the gel plug can then fill the remaining seven percent.

Figure 3:
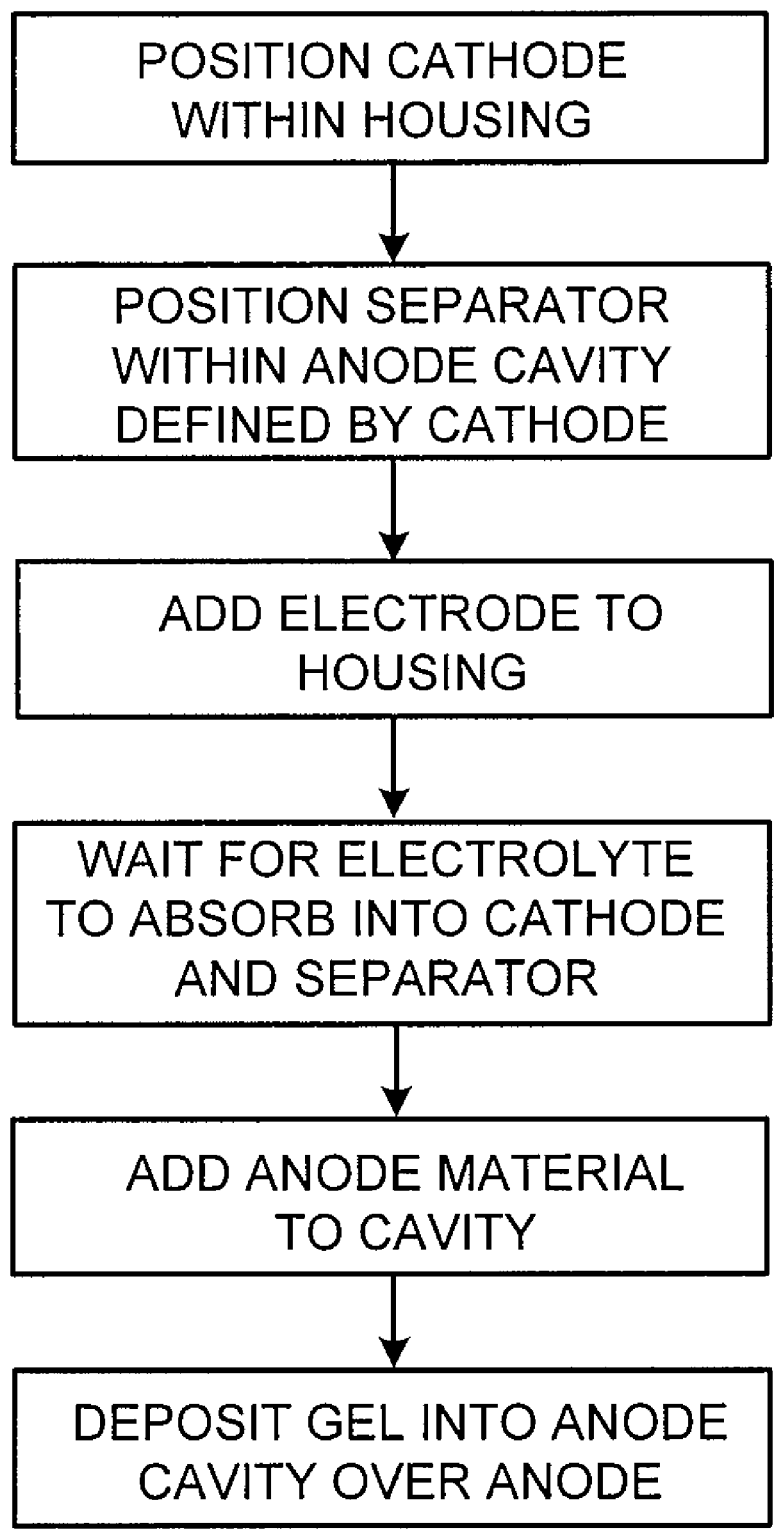
FIG. 3 is a flow chart of an embodiment of a method of making a battery with a gel plug.

The gel plug 30 can be added to the battery 10 by a number of manufacturing techniques. One manufacturing technique is disclosed in the flow chart of FIG. 3. The process involves first placing the cathode 12 within the battery housing 18 and placing the separator within the cavity defined by the cathode. The method can include adding a first amount of the electrolyte to the housing. An anode slurry can then be added to fill the cavity. Then an additional amount of the electrolyte is added in the form of a gel that forms the gel plug 30. In some embodiments, the anode slurry is not added until the first amount of the electrolyte is completely absorbed into the cathode and separator. For example, the electrolyte can absorb into the cathode and/or separator by capillary forces.

Figure 4:
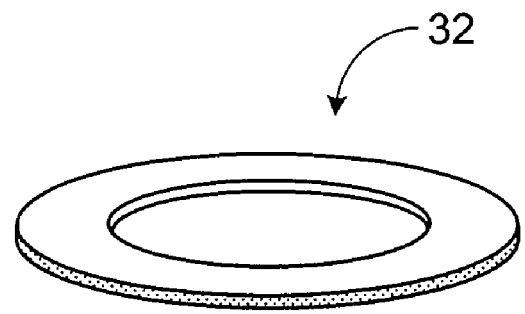
FIG. 4 depicts an embodiment of a washer shaped protective layer.

Battery 10, as shown in FIG. 1, also includes a protective layer 32 disposed on the top side of the cathode 12. This protective layer 32 can, in some embodiments, be a washer shaped piece of separator material having an inner and outer diameter approximately equal to that of the cathode 12. FIG. 4 depicts a prospective view of an example of the protective layer 32 of separator material in the shape of a washer. For example, a protective layer 32 can be formed of polypropylene (e.g., non-woven polypropylene or microporous polypropylene), polyethylene, polytetrafluoroethylene, a polyamide (e.g., a nylon), a polysulfone, a polyvinyl chloride, or combinations thereof. In some embodiments, a protective layer 32 can include a layer of cellophane combined with a layer of a non-woven material. The non-woven material can include, for example, polyvinyl alcohol and/or rayon. In general, the washer may be any material suitable as a separator between anode and cathode such as paper-like material made of pulp, PVA fibers, and/or any separator that comprises a polymeric material such as PVA, polyethylvinyl alcohol, cellophane, and combinations thereof. In some embodiments, the protective layer can be electronically insulating. For example, the protective layer can include a polymeric material resistant to potassium hydroxide (e.g., polyamide based sealants and/or asphalt-based sealants).

A battery, in some embodiments, can include a layer of cross-linked polyvinyl alcohol (e.g., boric acid cross-linked polyvinyl alcohol). The cross-linked polyvinyl alcohol can be coated onto a top side of the cathode, the anode, the top of the gel plug, or a combination thereof, and can minimize the migration of anode particles and/or minimize the direct contact between anode material and cathode material. The PVA layer can prevent electronic contact between any Zn particles and the cathode. The cross-linked polyvinyl alcohol can be prepared by dissolving boric acid in distilled water and adding polyvinyl alcohol ("PVA") powder to the solution at room temperature to create a suspension. The suspension can then be heated to 80 degrees Celsius and held at that temperature for about one hour. Once the suspension turns clear, a resulting boric acid cross-linked polyvinyl alcohol can be cooled and then used in the production of a battery. The ratio of boric acid to PVA can be between 1:15 and 1:25 (e.g., about 1:20). Typically, about 340 grams of deionized water are used per gram of boric acid. For example, 250 grams of deionized water can be mixed with 0.7365 grams of Fisher Boric Acid and 14.56 grams of Dupont Elvanol 71-30 PVA to create boric acid cross-linked polyvinyl alcohol. The layer of boric acid cross-linked polyvinyl alcohol can be ionically conductive, yet can provide a barrier between anode particles that are displaced from the cavity defined by the cathode and the top surface of the cathode.

The layer of cross-linked polyvinyl alcohol can, in some embodiments, act as a protective layer 32 disposed on the top side of the cathode 12 in the battery as shown in FIG. 1. In some embodiments, a layer of cross-linked polyvinyl alcohol can be used in addition to a washer shaped piece of separator material protective layer 32, and be positioned on the top side of the cathode between the cathode 12 and the washer shaped piece of separator material protective layer 32. In some embodiments, a layer of cross-linked polyvinyl alcohol can be coated on to the upper surface of an anode slurry within the cavity defined by the cathode, without the presence of the gel plug 30. In some embodiments, the layer of cross-linked polyvinyl alcohol can be positioned between a gel plug and the anode slurry, or be deposited on the top side of a gel plug. A layer of cross-linked polyvinyl alcohol over the anode cavity can minimize additional migration of anode particles within the cavity.

Figure 5A:
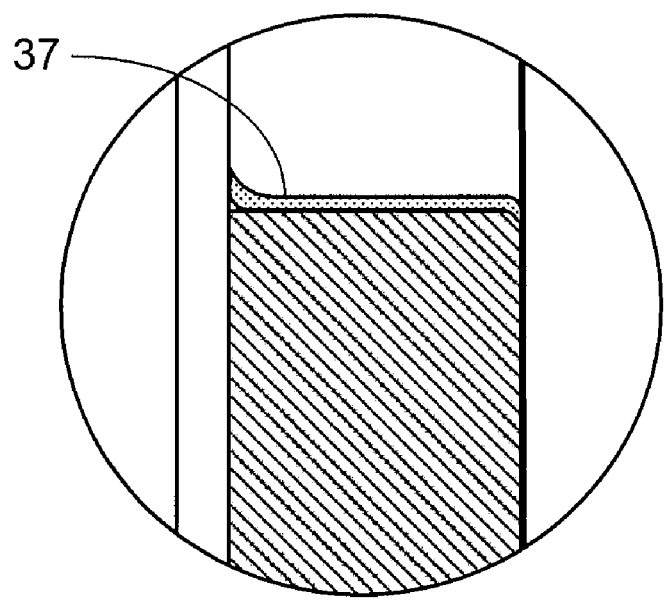
FIG. 5A depicts a close up of a layer of cross-linked polyvinyl alcohol on a top surface of the cathode.
Figure 5:
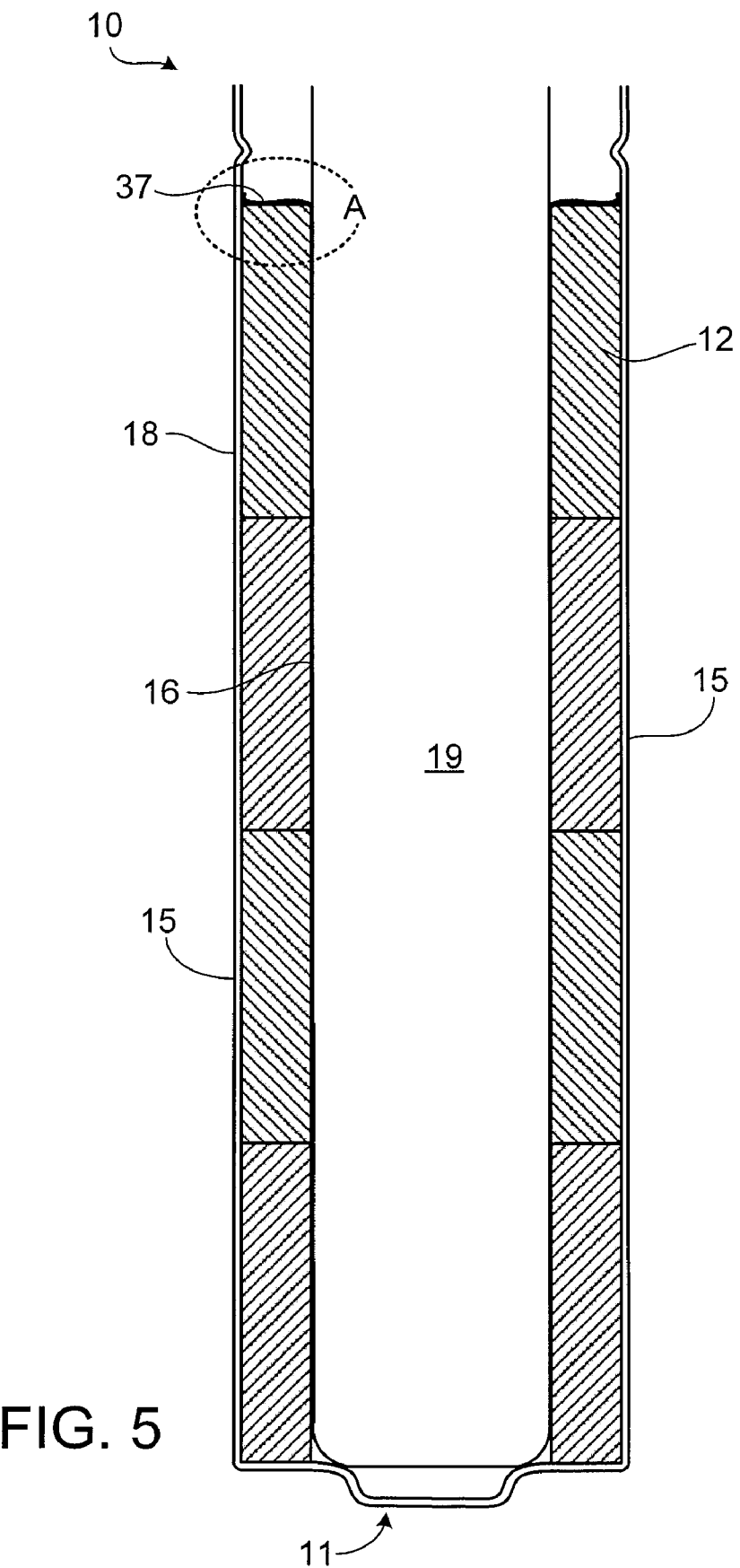
FIG. 5 depicts a battery housing including a cathode, a separator, and a layer of boric acid cross-linked polyvinyl alcohol.

For example, as shown in FIGS. 5 and 5A, an ionically conductive layer 37 of cross-linked polyvinyl alcohol (e.g. boric acid cross-linked polyvinyl alcohol) can be applied to a top side of cathode 12. FIG. 5 depicts a battery housing 18 including a cathode 12, a separator 16, and a protective layer 37 disposed on the top side of the cathode adjacent to the anode cavity 19, prior to the inclusion of the anode material into the anode cavity 19 or the addition of a cap and/or seal to the housing 18. As shown, the cross-linked PVA coating can cover part of the inside surface of the housing 18 and/or a very small portion of the top of the cathode that faces the anode cavity 19. For example, an ionically conductive coating of boric acid modified PVA can be applied onto the top of the cathode by a valve and a high speed rotation of the battery and cathode can produce an even coating. For example, a 3.5 weight percent PVA solution with 0.10 weight percent boric acid, which corresponds to 3 weight percent boric acid dry on dry basis (boric acid powder: PVA powder), can be applied to a cathode and housing of a AA size battery rotating at a speed of 775 rpm by an 18 gauge tipped needle (0.033 in). For example, an 18 gauge tipped needle is commercially available from EFD Inc., A Nordson Company, located in East Providence, R.I. The needle tip can be cut so it can lay relatively flat on the cathode top while the needle is at an angle of approximately 60 degrees. The rotational direction can be away from the direction of the needle. The bead can be modified to coat more or less of the inside surface of the housing 18 and/or the top inside surface of the cathode. AA sized batteries made under these conditions with a layer of boric acid cross-linked PVA coating the top side of the cathode showed improved drop test results over otherwise identical batteries not including any PVA coating. The drop test can include dropping a battery to allow free fall from a height of one meter under ambient conditions onto a hard, rigid surface of concrete to simulate a random drop of a battery by a consumer. The drop test can include dropping the battery six times, with two drops from each of the three mutually perpendicular directions (e.g., so that the battery impacts the concrete surface twice on each end and twice on the side of the cylindrical housing). The drop test includes storing the battery at ambient conditions for at least 24 hours after dropping the battery. When a failure of the drop test is defined as a loss of greater than 0.01 Volts in the open circuit voltage comparing the pre and post test values, a group without any PVA coating had a failure rate of 52 out of 1100, while the group including the cross-linked PVA coating over the cathode had a failure rate of just one out of 160, when each battery was dropped 6 times as described above.

The protective layer 32 can also be any material that is stable (substantially chemically inert) when in contact with the electrolyte and cathode. Other examples include a polyamide based adhesive such as VERSAMID or REAMID-100 available from Specialty Chemicals, a div of Fuji Hunt Co. The protective layer 32 may be an ethyl vinyl acetate polymer or a vinyl acetate/ethylene copolymer.

Figure 6:
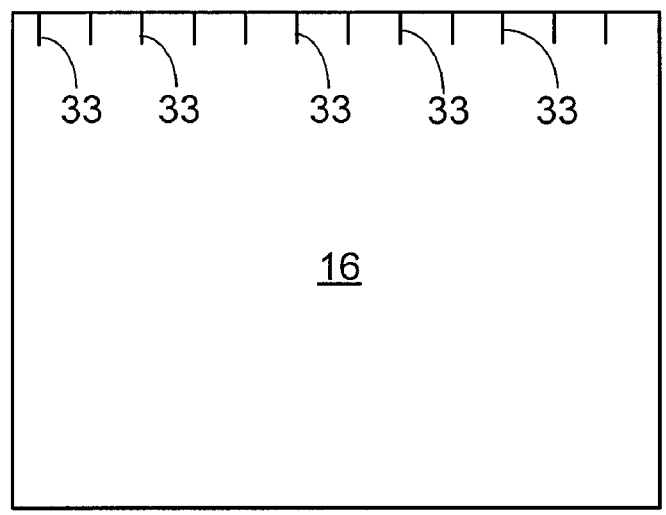
FIG. 6 depicts a piece of separator material having a plurality of notches in a top portion to define a plurality of segments.

The battery 10 also includes a separator, such as the separator 16 shown in FIGS. 1 or 6. The separator can be formed of any of the standard separator materials used in electrochemical cells (e.g., alkaline cells) and can be wrapped to form a sleeve defining a longitudinal wall corresponding to the dimensions of the anode cavity. The separator 16 prevents electrical contact between the anode 14 and the cathode 12. As shown in FIG. 1, the separator can have a closed bottom, which may be formed by a number of techniques. For example, a separator can be formed of polypropylene (e.g., non-woven polypropylene or microporous polypropylene), polyethylene, polytetrafluoroethylene, a polyamide (e.g., a nylon), a polysulfone, a polyvinyl chloride, or combinations thereof. In some embodiments, a separator can include a layer of cellophane combined with a layer of a non-woven material. The non-woven material can include, for example, polyvinyl alcohol and/or rayon.

A separator, such as separator 16, can be formed of any of the standard separator materials used in electrochemical cells (e.g., alkaline cells). For example, a separator can be formed of polypropylene (e.g., non-woven polypropylene or microporous polypropylene), polyethylene, polytetrafluoroethylene, a polyamide (e.g., a nylon), a polysulfone, a polyvinyl chloride, or combinations thereof. In some embodiments, a separator can include a layer of cellophane combined with a layer of non-woven material. The non-woven material can include, for example, polyvinyl alcohol and/or rayon.

Figure 7A:
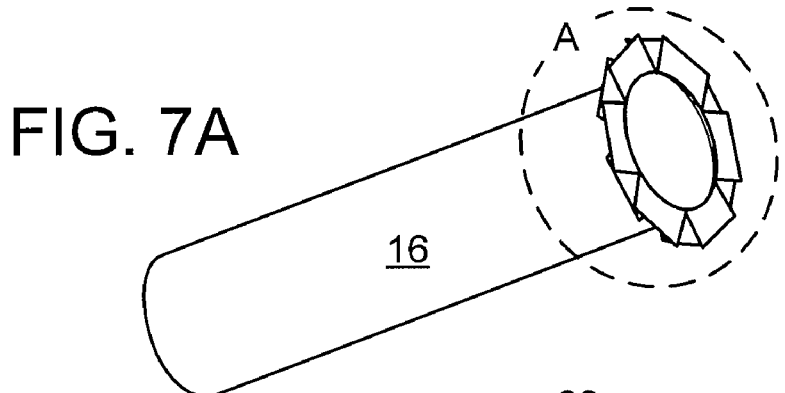
FIGS. 7A and 7B depict embodiments of a separator having segments of a top portion extending radially outward.
Figure 7B:
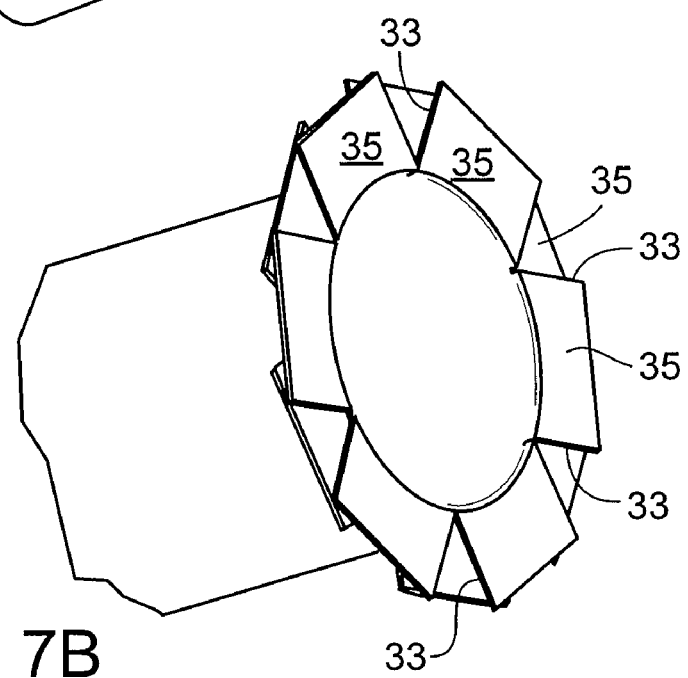

A protective layer disposed on the top side of a cathode can also be formed by a top portion of a separator itself. For example, as shown in FIGS. 6, 7A, and 7B, a separator 16 can include a piece of separator material including a plurality of notches 33 at at least one longitudinal end of the sleeve, the notches defining a plurality of segments 35. As shown in FIGS. 7A and 7B, the segments 35 can extend radially outward, as shown in FIG. 7B, to define the protective layer. The notches, as shown in FIG. 6, can be simple slits of a predetermined length. In other embodiments, the notches can have other shapes (e.g., V-shapes or U-shapes) that allow for the segments 35 of the top portion 30 to extend radially outward, as shown in FIG. 7B, approximately perpendicular to the body of the separator 16, to form a protective layer that can rest on the top side of a cathode adjacent to the anode cavity. In some embodiments, the separator 16 can include at least 1.8 wraps to have at least an 80% overlap of separator material based on the surface area of the separator. As shown in FIGS. 7A and 7B, separator 16 can include 2 wraps. In some embodiments, as shown in FIGS. 7A and 7B, the notches 33 can be offset from notches 33 in the adjacent wrap to allow segments 35 of the adjacent wrap to cover the spacing between segments in the adjacent wrap that result due to the flaring out of the segments. The radially outward extending notches can be in combination with a plastic seal 22 that rests on top of the cathode top so that the segments 35 of the separator are sandwiched between the cathode 12 and the plastic seal 22.

Notches in a lateral end of the separator can also provide for a better seal between the separator and the housing of the battery, which can minimize the migration of anode particles past the separator reducing undesirable contact with a top surface of the cathode.

Figure 8A:
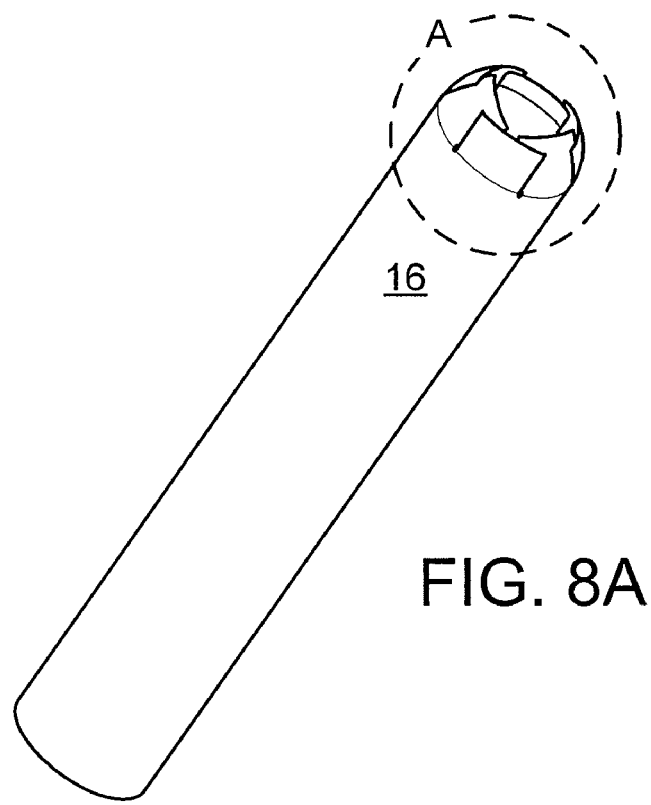
FIGS. 8A and 8B depict embodiments of a separator having segments of a top portion extending radially inward.
Figure 8B:
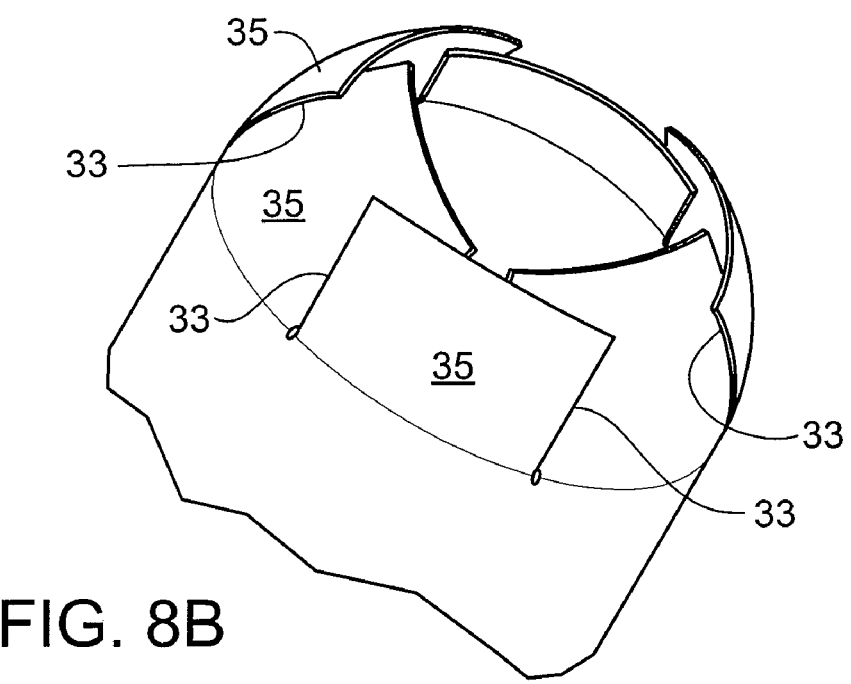

For example, the plurality of segments can positioned radially inward relative to the longitudinal wall to define a transverse wall. The housing can include a cell closure having an inside surface 26 positioned above the anode cavity and the transverse wall 17 can abut the inside surface to form a seal. For example, the inside surface of the cell closure can be a domed or convex surface. For example, as shown in FIG. 1, the battery can include a seal 22 and a cap 24 at the negative terminal, the seal having a convex inner surface 26 above the anode cavity. The notched lateral end of the separator 16 abuts the domed inner surface 26 to form a seal. As shown, the transverse wall also forms a convex shape. For example, as shown in FIG. 8A, the separator can include approximately 1.25 wraps of separator material, and can include evenly spaced notches 33. The notches, as shown, can be simple slits of a predetermined length. In other embodiments, the notches can have other shapes (e.g., V-shapes or U-shapes) that allow for the segments 35 of the top portion 30 to be flared in, as shown in FIG. 8B, against a domed upper surface of a battery housing. The presence of the notches 33 in the separator can allow for the segments 35 to overlap, and thus avoid the formation of wrinkles when a cap is placed over the anode and the inside surface of the cap presses the segments 35 of the separator inward.

A battery housing, such as housing 18, can be formed of one or more different materials. In some embodiments, a battery housing can include one or more metals and/or metal alloys, such as nickel, nickel-plated steel (e.g., nickel-plated cold-rolled steel), stainless steel, aluminum-clad stainless steel, aluminum, and/or aluminum alloys. In certain embodiments, a battery housing can include one or more plastics, such as polyvinyl chloride, polypropylene, polysulfones, acrylonitrile butadiene styrene (ABS), and/or polyamides. A seal such as seal 22 can be made of, for example, a polymer (e.g., nylon). A cap such as cap 24 can be made of, for example, a metal or a metal alloy, such as aluminum, nickel, titanium, or steel.

A cathode, such as cathode 12, can include at least one (e.g., two, three) cathode active material. In some embodiments, a cathode can further include at least one conductive aid and/or at least one binder. An electrolyte also is dispersed through the cathode. In some embodiments, the cathode active material can be a manganese oxide, such as manganese dioxide ($MnO_2$). The manganese dioxide can be electrolytically-synthesized $MnO_2$ (EMD), chemically-synthesized $MnO_2$ (CMD), or a blend of EMD and CMD. Distributors of manganese dioxides include Kerr-McGee Corp. (manufacturer of, e.g., Trona D and high-power EMD), Tosoh Corp., Delta Manganese, Delta EMD Ltd., Mitsui Chemicals, ERACHEM, and JMC. In certain embodiments, a cathode can include from about 80 percent by weight to about 94 percent by weight (e.g., from about 82 percent by weight to about 86 percent by weight) manganese dioxide (e.g., EMD) (the weight percentages being determined after the electrolyte has been dispersed through the cathode).

Other examples of cathode active materials include copper, nickel, and bismuth containing materials. For example, copper containing materials suitable for use as a cathode active material include copper oxides (e.g., cupric oxide (CuO), cuprous oxide ($Cu_2O$)); copper hydroxides (e.g., cupric hydroxide ($Cu(OH)_2$), cuprous hydroxide (Cu(OH))); cupric iodate ($Cu(IO_3)_2$); $AgCuO_2$; $LiCuO_2$; $Cu(OH)(IO_3)$; $Cu_2H(IO_6)$; copper-containing metal oxides or chalcogenides; copper halides (e.g., $CuCl_2$); and/or copper manganese oxides (e.g., $Cu(MnO_4)_2$). The copper oxides can be stoichiometric (e.g., CuO) or non-stoichiometric (e.g., $CuO_x$, where $0.5 \leq x \leq 1.5$). Another example of a cathode active material is $Cu_6InO_8Cl$. Nickel oxyhydroxide (NiOOH) can also be used as a cathode active material. The nickel oxyhydroxide can include, for example, a beta-nickel oxyhydroxide, a cobalt oxyhydroxide-coated beta-nickel oxyhydroxide, a gamma-nickel oxyhydroxide, a cobalt oxyhydroxide-coated gamma-nickel oxyhydroxide, a solid solution of a beta-nickel oxyhydroxide and a gamma-nickel oxyhydroxide, or a cobalt oxyhydroxide-coated solid solution of a beta-nickel oxyhydroxide and a gamma-nickel oxyhydroxide. Additional examples of cathode active materials include cathode active materials including a pentavalent bismuth-containing metal oxide.

In certain embodiments, a cathode can be porous. A porous cathode can include, for example, one or more of the above-described cathode active materials (e.g., EMD, NiOOH).

A conductive aid can increase the electronic conductivity of cathode 12. An example of a conductive aid is carbon particles. The carbon particles can be any of the conventional carbon particles used in cathodes. The carbon particles can be, for example, graphite particles. Graphite particles can be synthetic, non-synthetic, or a blend of synthetic and non-synthetic, and they can be expanded or non-expanded. In certain embodiments, the graphite particles in a cathode can be non-synthetic, non-expanded graphite particles. In such embodiments, the graphite particles can have an average particle size of less than about 20 microns (e.g., from about two microns to about 12 microns, from about five microns to about nine microns), as measured using a Sympatec HELIOS analyzer. Graphite particles can be obtained from, for example, Brazilian Nacional de Grafite (Itapecirica, MG Brazil (MP-0702X)) or Chuetsu Graphite Works, Ltd. (Chuetsu grades WH-20A and WH-20AF) of Japan. A cathode may include for example, from about three percent to about nine percent (e.g., from about four percent to about seven percent) carbon particles by weight. In some embodiments, a cathode can include from about four percent to about nine percent (e.g., from about four percent to about 6.5 percent) graphite particles by weight. Another example of a conductive aid is carbon fibers, such as those described in Luo et al., U.S. Pat. No. 6,858,349, and in Anglin, U.S. Patent Application Publication No. US 2002/0172867 A1, published on Nov. 21, 2002, and entitled "Battery Cathode". In some embodiments, a cathode can include less than about two percent by weight (e.g., less than about 1.5 percent by weight, less than about one percent by weight, less than about 0.75 percent by weight, less than about 0.5 percent by weight), and/or more than about 0.1 percent by weight (e.g., more than about 0.2 percent by weight, more than about 0.3 percent by weight, more than about 0.4 percent by weight, more than about 0.45 percent by weight) carbon fibers. In certain embodiments, a cathode can include from about one percent by weight to about 10 percent by weight of one or more total conductive aids.

A cathode can include other additives. In some embodiments, a cathode can include titanium dioxide ($TiO_2$). In certain embodiments, a cathode can include from about 0.1 percent to about two percent (e.g., from about 0.2 percent to about two percent) $TiO_2$ by weight.

A cathode can be made by mixing the cathode active material together with other components, such as a binder, solvent/water, and a carbon source. For example, a cathode active material such as $MnO_2$ may be combined with carbon (e.g., graphite, acetylene black), and mixed with small amount of water to form a cathode slurry. The cathode slurry can then be formed into a solid cathode by molding the slurry into cylindrical hollow pellets defining a lumen. In some embodiments, a current collector can then be coated with the cathode slurry to form the cathode. In some embodiments, the cathode slurry can be molded into a final shape within the housing 18. Examples of binders include polyethylene powders, polyacrylamides, Portland cement and fluorocarbon resins, such as polyvinylidenefluoride (PVDF) and polytetrafluoroethylene (PTFE). An example of a polyethylene binder is sold under the trade name Coathylene HA-1681 (available from Hoechst). A cathode may include, for example, up to about two percent binder by weight (e.g., up to about one percent binder by weight). In certain embodiments, a cathode can include from about 0.1 percent to about two percent (e.g., from about 0.1 percent to about one percent) binder by weight.

The electrolyte that is dispersed through a cathode (and/or the electrolyte used in the rest of a battery) can be any of the electrolytes used in batteries. In some embodiments, a cathode can include from about five percent to about 10 percent (e.g., from about six percent to about seven percent) electrolyte by weight. The electrolyte can be aqueous or non-aqueous. An aqueous electrolyte can be an alkaline solution, such as an aqueous hydroxide solution (e.g., LiOH, NaOH, KOH), or a mixture of hydroxide solutions (e.g., NaOH/KOH). For example, the aqueous hydroxide solution can include from about 33 percent by weight to about 40 percent by weight of the hydroxide material, such as about 9N KOH (about 37 percent by weight KOH). In some embodiments, the electrolyte can also include up to about four percent by weight (e.g., about two percent by weight) of zinc oxide.

The electrolyte can include other additives. As an example, the electrolyte can include a soluble material (e.g., an aluminum material) that reduces (e.g., suppresses) the solubility of the cathode active material in the electrolyte. In certain embodiments, the electrolyte can include one or more of the following: aluminum hydroxide, aluminum oxide, alkali metal aluminates, aluminum metal, alkali metal halides, alkali metal carbonates, or mixtures thereof. Electrolyte additives are described, for example, in Eylem et al., U.S. Patent Application Publication No. US 2004/0175613 A1, published on Sep. 9, 2004, and entitled "Battery".

An anode such as anode 14 can also include a gassing inhibitor. Gassing inhibitors can be inorganic materials, such as bismuth, tin, lead and indium. Alternatively, gassing inhibitors can be organic compounds, such as phosphate esters, ionic surfactants or nonionic surfactants. Examples of ionic surfactants are disclosed, for example, in Chalilpoyil et al., U.S. Pat. No. 4,777,100.

In some embodiments, a battery can include a hydrogen recombination catalyst to lower the amount of hydrogen gas that may be generated in the cell by the anode (e.g., when the anode includes zinc). Hydrogen recombination catalysts are described, for example, in Davis et al., U.S. Pat. No. 6,500,576, and in Kozawa, U.S. Pat. No. 3,893,870. Alternatively or additionally, a battery can be constructed to include pressure-activated valves or vents, such as those described in Tomantschger et al., U.S. Pat. No. 5,300,371.

A battery such as battery 10, in some embodiments, can be a primary electrochemical cell. Primary cells are meant to be discharged (e.g., to exhaustion) only once, and then discarded. Primary cells are not intended to be recharged. Primary cells are described, for example, in David Linden, *Handbook of Batteries* (McGraw-Hill, 2d ed. 1995). In other embodiments, the features described herein can be used within a secondary electrochemical cell. Secondary electrochemical cells can be recharged for many times (e.g., more than fifty times, more than a hundred times, or more). In some embodiments, secondary cells can include relatively robust separators, such as separators that have many layers and/or separators that are relatively thick. Secondary cells can also be designed to accommodate for changes, such as swelling, that can occur in the cells. Secondary cells are described, for example, in Falk & Salkind, "Alkaline Storage Batteries", John Wiley & Sons, Inc. 1969, and in Virloy et al., U.S. Pat. No. 345,124.

A battery such as battery 10 can be of any of a number of different voltages (e.g., 1.5 V, 3.0 V, 4.0 V), and/or can be, for example, a AA, AAA, AAAA, C, or D battery. While battery 10 is cylindrical, in some embodiments, a battery can be non-cylindrical.

A battery having one or more of the features described herein can have less than a two percent chance of experiencing a voltage drop of greater than a 0.01 volt between a pre drop test OCV measurement and a post drop test OCV measurement (e.g., less that two percent of identical batteries having one or more of the features can have less than a 0.01 volt drop after drop testing the batteries). The drop test includes the steps of dropping the battery six times from a height of 1 meter onto a concrete surface, including dropping each battery so that the battery lands twice on each end of the battery and so that it lands twice along the side of the housing of the battery, and storing the battery after the six drops for at least 24 hours at room temperature prior to testing the battery with an post drop test OCV measurement. Furthermore, batteries having one or more of the features described herein can have at least 98 percent chance of retaining at least 95% of the capacity of the battery after a drop test (e.g., at least 98% of identical batteries having one or more of the features retain at least 95% of their capacity after a drop test).

A number of embodiments have been described. Nevertheless, it will be understood that various modifications may be made without departing from the spirit and scope of this disclosure. For example, each of the above described features can be used alone, or in combination with the other features. Accordingly, other embodiments are within the scope of the following claims.

What is claimed is:

1. An alkaline battery comprising:
   (a) a housing;
   (b) a cathode within the housing, the cathode defining an anode cavity and having a top surface adjacent to the cavity;
   (c) an anode deposited within the anode cavity;
   (d) a separator between the anode and the cathode, wherein the separator includes a plurality of notches at least one longitudinal end of the battery, the notches defining a plurality of segments, the plurality of segments being inwardly or outwardly radially disposed relative to a longitudinal wall of the separator; and
   (e) an alkaline electrolyte contacting the anode and the cathode.

2. The battery of claim 1, wherein the anode comprises zinc and the cathode comprises manganese dioxide.

3. The battery of claim 1, wherein the separator comprises a piece of separator material wound into a sleeve having a longitudinal wall defining a cross-sectional shape corresponding to dimensions of the anode cavity.

4. An alkaline battery comprising:
   (a) a housing;
   (b) a cathode within the housing, the cathode defining an anode cavity and having a top surface adjacent to the cavity;
   (c) an anode deposited within the anode cavity;
   (d) a separator between the anode and the cathode, wherein the separator comprises a piece of separator material wound into a sleeve having a longitudinal wall defining a cross-sectional shape corresponding to dimensions of the anode cavity, wherein the separator includes a plurality of notches at least one longitudinal end of the sleeve, the notches defining a plurality of segments;
   (e) an alkaline electrolyte contacting the anode and the cathode; and
   (f) a protective layer deposited on the top surface of the cathode.

5. The battery of claim 4, wherein the plurality of segments are positioned radially inward relative to the longitudinal wall of the sleeve to define a transverse wall.

6. The battery of claim 5, wherein the housing comprises a cell closure having a convex inside surface positioned above the anode cavity and wherein the transverse wall has a convex shape and abuts the convex inside surface.

7. The battery of claim 4, wherein the sleeve comprises at least an 80% overlap of the piece of separator material based on the surface area of the sleeve and the plurality of segments extend radially outward to define the protective layer.

8. The battery of claim 3, wherein the sleeve has at least a 25% overlap of the piece of separator material based on the surface area of the sleeve.

9. The battery of claim 1, further comprising a protective layer that comprises a washer shaped piece of separator material deposited on the top surface of the cathode.

10. The battery of claim 9, wherein the protective layer is electronically insulating and comprises a polymeric material resistant to potassium hydroxide.

11. The battery of claim 10, wherein the polymeric material is selected polyamide based sealants, asphalt-based sealants, and combinations thereof.

12. The battery of claim 9, wherein the protective layer comprises a layer of polyvinyl alcohol.

13. The battery of claim 12, wherein the polyvinyl alcohol is cross-linked.

14. The battery of claim 9, wherein the protective layer comprises a layer of ethyl vinyl acetate polymer or a vinyl acetate/ethylene copolymer.

15. The battery of claim 1, further comprising a layer of cross-linked polyvinyl alcohol on the top surface of the cathode, the anode, or a combination thereof.

16. The battery of claim 1, further comprising a gel deposited over the anode within the cavity, the gel material comprising an amount of the electrolyte and an amount of a gellant also present within the anode.

17. The battery of claim 1, wherein less than two percent of batteries having the same structure as the battery experience voltage drop of greater than a 0.01 volts between a pre drop test Open Circuit Voltage measurement and a post drop test Open Circuit Voltage measurement, the drop test consisting of dropping each battery six times from a height of 1 meter onto a concrete surface, including dropping each battery so that the battery lands twice on each end of the battery and so that it lands twice along the side of the housing of the battery, and storing the battery after the six drops for at least 24 hours at room temperature prior to the post drop test Open Circuit Voltage measurement.

18. The battery of claim 1, wherein at least 98 percent of batteries having the same structure as the battery retain at least 95% of the capacity of the battery after a drop test, the drop test consisting of dropping each battery six times from a height of 1 meter onto a concrete surface, including dropping each battery so that the battery lands twice on each end of the battery and so that it lands twice along the side of the housing of the battery, and storing the battery after the six drops for at least 24 hours at room temperature prior to determining the remaining capacity of the battery.

19. The battery of claim 4, wherein the anode comprises zinc and the cathode comprises manganese dioxide.

20. The battery of claim 4, wherein the sleeve has at least a 25% overlap of the paper based on the surface area of the sleeve.

21. The battery of claim 4, wherein the protective layer comprises a washer shaped piece of separator material.

22. The battery of claim 4, wherein the protective layer is electronically insulating and comprises a polymeric material resistant to potassium hydroxide.

23. The battery of claim 22, wherein the polymeric material is selected polyamide based sealants, asphalt-based sealants, and combinations thereof.

24. The battery of claim 4, wherein the protective layer comprises a layer of polyvinyl alcohol.

25. The battery of claim 24, wherein the polyvinyl alcohol is cross-linked.

26. The battery of claim 4, wherein the protective layer comprises a layer of ethyl vinyl acetate polymer or a vinyl acetate/ethylene copolymer.

27. The battery of claim 4, further comprising a layer of cross-linked polyvinyl alcohol on the top surface of the cathode, the anode, or a combination thereof.

28. The battery of claim 4, further comprising a gel deposited over the anode within the cavity, the gel material comprising an amount of the electrolyte and an amount of a gellant also present within the anode.

29. The battery of claim 4, wherein less than two percent of batteries having the same structure as the battery experience voltage drop of greater than a 0.01 volts between a pre drop test Open Circuit Voltage measurement and a post drop test Open Circuit Voltage measurement, the drop test consisting of dropping each battery six times from a height of 1 meter onto a concrete surface, including dropping each battery so that the battery lands twice on each end of the battery and so that it lands twice along the side of the housing of the battery, and storing the battery after the six drops for at least 24 hours at room temperature prior to the post drop test Open Circuit Voltage measurement.

30. The battery of claim 4, wherein at least 98% of batteries having the same structure as the battery retain at least 95% of the capacity of the battery after a drop test, the drop test consisting of dropping each battery six times from a height of 1 meter onto a concrete surface, including dropping each battery so that the battery lands twice on each end of the battery and so that it lands twice along the side of the housing of the battery, and storing the battery after the six drops for at least 24 hours at room temperature prior to determining the remaining capacity of the battery.

31. The battery of claim 4, wherein the plurality of segments are positioned radially inward relative to the longitudinal wall to define a transverse wall abutting an inside surface of a cell closure.

* * * * *